Patented Feb. 4, 1947

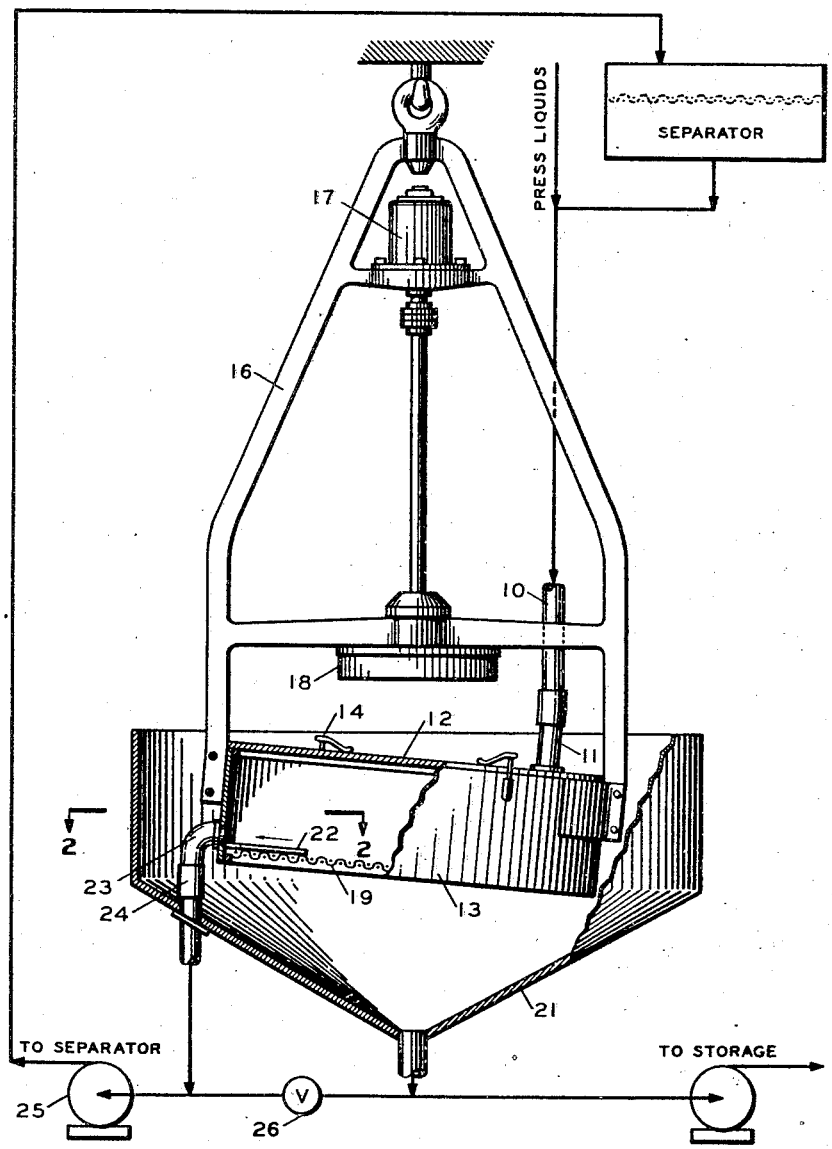
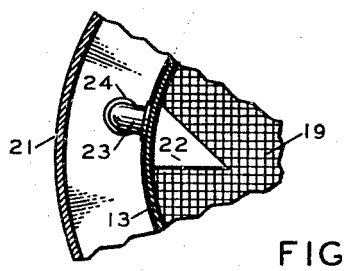
FIG. 1
FIG. 2
Edward J. Wendt
INVENTOR.

2,415,268

UNITED STATES PATENT OFFICE 2,415,268

MANUFACTURE OF CASEIN BY MEANS OF GYRATORY MOTION APPLIED TO AN INCLINED SCREEN

Edward J. Wendt, Elroy, Wis., assignor to Hercules Powder Company, Wilmington, Del., a corporation of Delaware Application September 26, 1942, Serial No. 459,863

4 Claims. (Cl. 210—149)

This invention relates to the manufacture of casein and more particularly to an improved apparatus and process for such manufacture.

Heretofore it has been customary to precipitate milk by the addition of suitable precipitants thereto, thus forming a mass of whey and relatively large lumps of casein together with a substantial portion of extremely fine particles of casein. Prior practice has involved the separation of the whey from the relatively large lumps of casein. Most of the very fine particles of casein have stayed in suspension in the whey and have been removed therewith. Loss of casein in this manner reduces the efficiency of the process. Attempts have been made to recover the suspended extremely fine particles of casein by passing the whey into a settling tank where it is allowed to settle for some hours or days whereupon more or less unsatisfactory efforts have been made to recover the settled casein.

Similar difficulties have been met with in connection with the wash water used for washing the casein after it was separated from the whey. Thus the washing of the relatively large lumps of casein inevitably results in the suspension of the very fine particles of casein in the water which is separated and passed to waste, thus entailing loss of the casein fines, creating sewage disposal problems, etc.

The principal object of the present invention is to provide a satisfactory method of recovering the very fine particles of casein suspended in the whey or wash water.

Another object is to provide apparatus for carrying out this recovery.

Another object is to provide for the recovery of high grade casein from the whey and wash water.

Other objects will more fully hereinafter appear.

In the accompanying drawing there is illustrated one form of apparatus which has been found to be satisfactory for carrying out the recovery method of the present invention. In the drawing:

Fig. 1 is an elevational view partly in section of the entire apparatus.

Fig. 2 is an enlarged section on the line 2—2 of Fig. 1.

In accordance with the present invention the precipitated casein is received in a whey separator which may be of any conventional type, wherein a screen or perforated plate catches the larger casein particles and allows whey to pass, carrying with it the suspended casein fines of smaller particle size.

The whey together with the suspended casein particles passes out of the whey separator by way of pipe 10 which is connected to a gyratory sifting device. Pipe 10 has a flexible coupling 11 which is coupled to the cover 12 of the sifting pan 13. The cover 12 is detachably mounted by means of clamps 14 to the pan 13 of the gyratory sifting device.

The gyratory sifter comprises support members 16 on which is mounted an electric motor 17 which drives the eccentric or unbalancing member 18 thus causing the mesh sieve 19 mounted fixedly in the bottom of the pan 13 to gyrate or vibrate at high speed, say 900 gyrations or vibrations per minute. The size of the mesh in the sieve may vary but a Number 200 mesh sieve has been found desirable. Screen sizes are indicated in the present specification, and in the appended claims, in accordance with the United States Bureau of Standards, Standard Screen Series designations.

The whey passes through the gyrating mesh sieve 19 and is collected by the catch basin 21 from which it may be pumped to storage or to waste.

By tilting the pan 13 and the sieve 19 in the manner shown, preferably at an angle approaching 5° to the vertical, the fines collecting on the sieve 19 gradually travel around the circumference of the screen in the direction of rotation of the motor and collect to a greater extent on the high sides of the pan 13, at which side fines with a relatively small amount of whey are continuously collected by flat plate 22 and removed by overflowing through a discharge tube 23 which has a flexible coupling 24 to allow for the gyratory movement. This fluid mixture of fines is passed by way of pump 25 back into the whey separator or directly to a drier or storage.

The fines are somewhat clotted and pressed together by the action of the gyrating sifter and the pump and are thus easily picked up in the whey separator by adhesion to the large lumps of curd which have just been precipitated and introduced into the whey separator. Freshly precipitated casein is continuously introduced into the whey separator where it commingles with the returned clotted fines. Thus the fines which are continuously produced during processing of the curd are removed from the whey and put back into the production line, and are removed by adhesion to the large lumps of casein which have just been precipitated but have not yet been pressed or washed.

In order to prevent occasional clogging of pump 25 by the entry into it of a particularly large amount of solids, a small amount of screened whey may be bled into the solids at a point ahead of the pump by means of valve 26.

Instead of using whey as the material passed through the gyratory sifting device, the invention may be applied as well to removing casein fines from wash water or to the liquid from the casein curd press.

The separation of fine particles of other types of proteins, such as soya bean protein, or cheese, may be accomplished by this process and apparatus.

The present process could be carried out in other types of apparatus but the one herein described is particularly adaptable.

The present invention is particularly advantageous because it eliminates the use of settling tanks for the recovery of casein fines, which results in lower labor cost for handling settlings, more satisfactory recovery, and in the elimination of the production of low quality casein which ensues when casein fines are recovered by means of the conventional settling tanks due to the long standing of the casein fines in contact with the whey or wash water in these tanks. It will be understood that when using the process of this invention the casein fines are substantially immediately recovered and returned to the whey separator, where they are almost immediately picked up by freshly precipitated lumps of casein. Numerous other advantages of the process and apparatus of the present invention will be at once apparent to those skilled in the art.

What I claim and desire to protect by Letters Patent is:

1. An apparatus for the separation of very fine particles from a liquid comprising a means for causing gyratory motion, a closed pan attached to said gyratory means, an inlet for liquid to the interior of said pan, a fine mesh screen in the bottom of said pan tilted from the horizontal, an outlet in the pan at the highest point on the screen and a catch basin under the pan to collect the liquid.

2. An apparatus for the separation of very fine particles from a liquid comprising a means for causing gyratory motion, a closed pan attached to said gyratory means, an inlet for liquid to the interior of said pan, a fine mesh screen in the bottom of said pan tilted at an angle from the horizontal, a means at the higher edge of said screen adapted to remove the fine particles continuously, and a catch basin under the pan to collect the liquid.

3. An apparatus for the separation of very fine particles from a liquid comprising a means for causing gyratory motion, a closed pan attached to said gyratory means, an inlet for liquid to the interior of said pan, a fine mesh screen in the bottom of said pan tilted at an angle from the horizontal, a flat plate at the higher edge of said screen adapted to collect the fine particles continuously, outlet means adapted to remove the collected fine particles from the closed pan, and a catch basin under the pan to collect the liquid.

4. An apparatus for the separation of very fine particles of casein from a liquid comprising a means for causing gyratory motion, a closed pan attached to said gyratory means, an inlet for liquid to the interior of said pan, about a 200 mesh screen in the bottom of said pan tilted at an angle from the horizontal, a flat plate at the higher edge of said screen adapted to remove the fine particles continuously, and a catch basin under the pan to collect the liquid.

EDWARD J. WENDT.

REFERENCES CITED

The following references are of record in the file of this patent:

UNITED STATES PATENTS

| Number | Name | Date |
| --- | --- | --- |
| 1,413,672 | Lowe | Apr. 25, 1922 |
| 2,184,002 | Pagel | Dec. 19, 1939 |
| 2,066,364 | Rafton | Jan. 5, 1937 |
| 2,089,548 | Frantz et al. | Aug. 10, 1937 |
| 2,251,909 | Lindsay | Aug. 12, 1941 |
| 2,036,397 | Clarke et al. | Apr. 7, 1936 |
| 1,607,013 | Meyerhofer | Nov. 16, 1926 |
| 1,392,345 | Lowe | Oct. 4, 1921 |
| 1,465,931 | Collins | Aug. 28, 1923 |
| 2,209,694 | Harford | July 30, 1940 |

FOREIGN PATENTS

| Number | Country | Date |
| --- | --- | --- |
| 254,233 | German | Nov. 27, 1912 |